United States Patent [19]

Kolodjski

[11] Patent Number: 4,523,462
[45] Date of Patent: Jun. 18, 1985

[54] CONSTANT TEMPERATURE ANEMOMETER HAVING AN ENHANCED FREQUENCY RESPONSE

[75] Inventor: Kenneth J. Kolodjski, Minneapolis, Minn.

[73] Assignee: TSI Incorporated, St. Paul, Minn.

[21] Appl. No.: 495,087

[22] Filed: May 16, 1983

[51] Int. Cl.³ .............................................. G01F 1/68
[52] U.S. Cl. ..................................................... 73/204
[58] Field of Search ............... 73/27 R, 204; 323/365, 323/366, 367; 324/DIG. 1; 374/168

[56] References Cited

U.S. PATENT DOCUMENTS

| 3,645,133 | 2/1972 | Simeth et al. | 73/204 |
| 3,765,244 | 10/1983 | Brzezinski | 374/168 |
| 4,311,042 | 1/1982 | Hosoya et al. | 73/204 |

OTHER PUBLICATIONS

Disa Information dated May 1971, p. 38, entitled "New Improvements in Anemometry Instruments".
Disa Information dated May 1971, p. 39, entitled "Description of the Individual Units".
Disa Information dated May 1971, p. 42, entitled "Improvements in Frequency Response".
Journal of Fluids Engineering, Dec. 1976, entitled "A Simple Linearized Hot-Wire Anemometer", pp. 749–752.
Department of Civil Engineering, Colorado State University, entitled "A Dual-Amplifier Hot-Wire Anemometer".
von Karman Institute for Fluid Dynamics, entitled "Theory and Design of a Constant Temperature Linearized Hot Wire Anemometer", dated Oct., 1974.
Department of Aerospace Engineering Sciences, University of Colorado, paper entitled "Analysis of a New Hot-Wire Anemometer with Shaped Bridge Impedance", 1982.
Department of Aerospace Engineering Sciences, University of Colorado, entitled "Off-Optimum Operation of Constant Temperature Hot-Wire Anemometers", dated 1982.

Primary Examiner—Herbert Goldstein
Attorney, Agent, or Firm—Schroeder & Siegfried

[57] ABSTRACT

A constant temperature anemometer having an enhanced frequency response. A sensor element is included within one leg of a bridge circuit with a feedback circuit being operatively connected to the bridge circuit. The bridge circuit frequency response is shaped by impedance elements connected in parallel with another leg of the bridge circuit. In a preferred embodiment, the impedance elements include serially connected resistance and capacitance elements.

7 Claims, 3 Drawing Figures

4,523,462

CONSTANT TEMPERATURE ANEMOMETER HAVING AN ENHANCED FREQUENCY RESPONSE

BACKGROUND OF THE INVENTION

Constant temperature anemometers (CTAs) are known to the prior art. In such devices, a heated resistance element serves as a sensing element. The sensing element has a temperature coefficient of resistance and is maintained at constant resistance and, thus, temperature.

Typical prior art constant temperature anemometers place the sensor in one leg of a bridge circuit with a feedback circuit, including an amplifier, being employed to maintain balance on the bridge. An example of such anemometer is illustrated in FIG. 1 wherein the sensing element or sensor is designated at 10 and forms one leg of a bridge, the other bridge legs being formed by resistances 11–13. An operational amplifier 14 has it inputs connected to two separate junctions on the bridge circuit with its output connected to a third bridge junction. The fourth bridge junction is grounded. Resistances 11 and 12 determine the "bridge ratio" while the resistance 13 determines the operating resistance of the sensor.

If the environmental conditions surrounding the sensor 10 of FIG. 1 decrease its heat loss in the wind tunnel, the sensor tends to increase in temperature. The operational amplifier 14 senses this as a bridge off-balance and decreases its output until the bridge again approaches balance. For low frequencies, operational amplifier 14 having high gain, maintains the bridge very close to balance over a wide range of current flow through the sensor 10.

A major problem with constant temperature anemometers of the type illustrated in FIG. 1 is the maintenance of stable operation at high frequencies. Ideally, this should be accomplished with simple controls and without restricting the type of sensor that may be employed. Any adjustments should also minimize the change in maximum frequency response as the operating point changes.

Although the circuit of FIG. 1 appears quite simple, an analysis of its stability as a constant temperature anemometer is quite complex. One analysis is provided by P. Freymuth, in an article entitled "Frequency Response and Electronic Testing for Constant Temperature Hot-Wire Anemometers," *Journal of Physics E: Scientific Instruments*, Vol. 10, 1977. In essence, two controls are necessary for optimization of this CTA system, one to "trim" the reactance of the bridge, and the other to influence the closed loop gain of the system at high frequencies.

A prior art approach to the optimization discussed above is illustrated in FIG. 2. Throughout FIGS. 1–3, like reference numerals indicate the corresponding circuit elements. In FIG. 2, a variable inductor 15 is provided to adjust the reactance of the bridge while the gain of the operational amplifier 14 is "shaped" by an RC circuit designated generally at 16 in the feedback loop. The RC circuit 16 is formed of a capacitance 17 and a variable resistance 18. At high frequencies, the gain of operational amplifier 14 is reduced to a value established by the resistance of the variable resistor 18. While it provides an improvement over the anemometer shown in FIG. 1, the circuit of FIG. 2 is not stable when the cut-off frequency of the sensor approximates that of the RC circuit 16. In addition, the adjustments to the inductance 15 and the RC circuit 16 are coupled—a change in one changes the optimum setting for the other—which increases the time required for optimization.

DETAILED DESCRIPTION OF THE PREFERRED EMBODIMENTS

Figure 1:
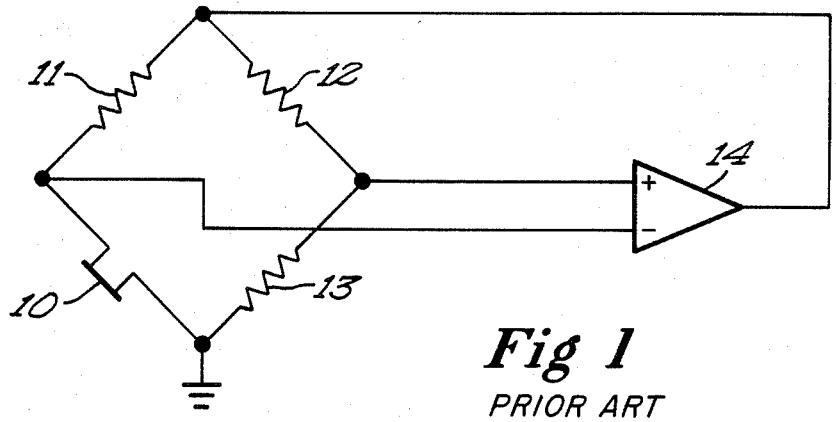
FIG. 1 illustrates a prior art constant temperature anemometer.
Figure 2:
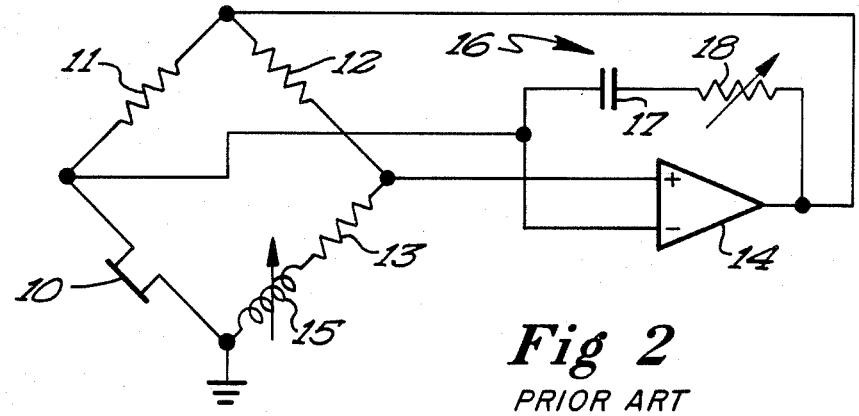
FIG. 2 illustrates an improved prior art constant temperature thermal anemometer.
Figure 3:
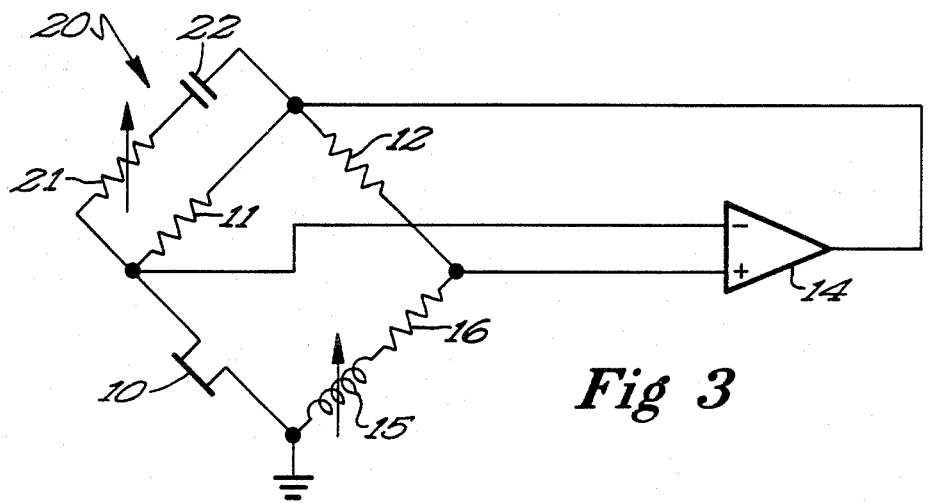
FIG. 3 ilustrates a preferred embodiment of the present invention.

FIG. 3 illustrates a preferred embodiment of the present invention as an improvement to the prior art constant temperature anemometer illustrated in FIG. 1. Elements 10–14 of the CTA of FIG. 1 are employed, as well as a variable inductor 15, as discussed with reference to FIG. 2. In the embodiment of FIG. 3, as in the CTA of FIG. 2, the variable inductor 15 is employed to adjust or "trim" the reactance of the bridge. However, an RC circuit 20 including a variable resistance 21 and capacitor 22 are shown serially connected to each other and connected in parallel with the resistance 11 within the bridge of FIG. 3. The RC circuit 20 of FIG. 3 serves to adjust the effect of high frequency on the gain of the system but, in a different way which has advantages over other prior art techniques, for example that of FIG. 2. That is, the RC circuit 16 of FIG. 2 adjusts or "shapes" the gain of the operational amplifier 14 while the RC circuit 20 of FIG. 3 adjusts or "shapes" the frequency response of the bridge by providing a frequency dependent alteration in the effective imepedance of the leg shunted by RC circuit 20. This difference (shaping the frequency response of the bridge versus shaping the frequency response of the amplifier) provides the operational advantages of the present invention.

The system of FIG. 3 is simple, stable for all sensor types and minimizes the effect of changes in the operating point on frequency response. In addition, adjustments in bridge reactance (via variable inductor 15) and effective high frequency gain (via variable resistance 21) are decoupled, thus reducing the time for optimum adjustment. In practice, it is simply easier to adjust. The operational amplifier 14 may be of the type described in LINEAR Applications handbook of National Semiconductor Corporation, 2900 Semiconductor Drive, Santa Clara Calif. 95051, on pages 2-190 though 2-198.

The circuit of FIG. 3 is easily implemented by one familiar with prior art constant temperature anemometers. Obviously, where single elements are shown, multiple elements may be substituted. For example, a variable element may be formed with an element of fixed value serially connected with a like variable element. The capacitance 22 is preferably large—for example, 0.1 microferad. Variable resistance 21 may be formed by a fixed resistance of 243 ohms serially connected with a variable resistance nominally rated at 100K ohms. The values of the other circuit elements may be as commonly employed by the prior art and are therefore within the skill of the art of the operator.

Obviously, many modifications and variations of the present invention are possible in light of the above teachings. For example, FIG. 3 illustrates a system whereby the frequency response of the bridge circuit is shaped by an RC shunt across resistance 11. Such a shunt has the effect of increasing the bridge ratio (determined by resistances 11 and 12) at high frequencies. Alternatively, a similar shunt across the leg including resistance 13 would have the effect of decreasing the operating resistance of the bridge circuit with increasing frequency. Also, the invention is not limited to any particular thermal sensor 10 and specifically embraces the use of both hot film and hot wire sensors, both of which are known to the prior art and may be found described in the 1978 catalogue of TSI Incorporated, 500 Cardigan Road, P.O. Box 43394, St. Paul, Minn. 55164 on pages 33-75. It is therefore to be understood that, within the scope of the appended claims, the invention may be practiced otherwise than as specifically described.

What is claimed is:

1. In a constant temperature anemometer of the type having bridge circuit means, including sensor element means in one leg thereof, and having feedback circuit means operatively connected to said bridge circuit means, the improvement for enhancing anemometer frequency response which comprises means connected in shunt across a leg of said bridge circuit means for providing a frequency dependent impedance of the leg shunted by said means.

2. The constant temperature anemometer of claim 1 wherein said frequency dependent impedance comprises a serially connected resistance means and capacitance means.

3. In a constant temperature anemometer of the type having bridge circuit means, including sensor element means in one leg thereof, and having feedback circuit means operatively connected to said bridge circuit means, said feedback circuit means including high gain amplifier means, the improvement which comprises means connected in parallel with another leg of said bridge circuit means for providing a frequency dependent alteration in the effective impedance of said another leg.

4. The constant temperature anemometer of claim 3 wherein said parallel connected means comprises serially connected resistance means and capacitance means.

5. The constant temperature anemometer of claim 3 wherein aid bridge circuit means further comprises means for trimming said bridge reactance means connected with yet another leg of said bridge circuit means.

6. The constant temperature anemometer of claim 5 wherein said sensor element means comprises hot wire means.

7. The constant temperature anemometer of claim 5 wherein said sensor element means comprises hot film means.

* * * * *

UNITED STATES PATENT AND TRADEMARK OFFICE
CERTIFICATE OF CORRECTION

PATENT NO. : 4,523,462
DATED : June 18, 1985
INVENTOR(S) : Kenneth J. Kolodjski

It is certified that error appears in the above-identified patent and that said Letters Patent are hereby corrected as shown below:

Column 4, Line 19 after the word wherein, "aid" should have been --said--.

Signed and Sealed this

Fifth Day of November 1985

[SEAL]

Attest:

Attesting Officer

DONALD J. QUIGG

Commissioner of Patents and Trademarks